(12) United States Patent
Reston et al.

(10) Patent No.: US 10,826,890 B2
(45) Date of Patent: *Nov. 3, 2020

(54) MULTI-LEVEL AUTHENTICATION SYSTEM WITH PERSISTENT INTEGRATION PLATFORM

(71) Applicant: Bank of America Corporation, Charlotte, NC (US)

(72) Inventors: Brent David Reston, Tiburon, CA (US); Margaret Winston, San Francisco, CA (US); Kevin Clark May, Waxhaw, NC (US); Jeremiah Fairbairn Williams, Fort Mill, SC (US); Ryan Michael Furey, Charlotte, NC (US); Michelle Nanette Downie, Weddington, NC (US); Charles R. Liu, San Francisco, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/153,086

(22) Filed: Oct. 5, 2018

(65) Prior Publication Data

US 2019/0109839 A1    Apr. 11, 2019

Related U.S. Application Data

(60) Provisional application No. 62/569,032, filed on Oct. 6, 2017.

(51) Int. Cl.
*H04L 29/06* (2006.01)

(52) U.S. Cl.
CPC ........ *H04L 63/083* (2013.01); *H04L 63/0861* (2013.01); *H04L 2463/082* (2013.01)

(58) Field of Classification Search
CPC ............... H04L 63/083; H04L 63/0861; H04L 2463/082
USPC .......................................................... 726/7
See application file for complete search history.

(56) References Cited

U.S. PATENT DOCUMENTS

| 6,442,748 | B1 | 8/2002 | Bowman-Amuah |
| 6,529,948 | B1 | 3/2003 | Bowman-Amuah |
| 6,775,782 | B1 * | 8/2004 | Buros .................... G06Q 20/04 380/30 |
| 7,072,934 | B2 | 7/2006 | Helgeson et al. |
| 7,089,584 | B1 | 8/2006 | Sharma |
| 7,143,190 | B2 | 11/2006 | Christensen et al. |
| 7,219,327 | B1 | 5/2007 | Jacobs et al. |
| 7,356,559 | B1 | 4/2008 | Jacobs et al. |
| 7,454,462 | B2 | 11/2008 | Belfiore et al. |

(Continued)

*Primary Examiner* — Mohammad W Reza
(74) *Attorney, Agent, or Firm* — Michael A. Springs; Moore & Van Allen PLLC; Seongun M. Hong

(57) ABSTRACT

Embodiments of the present invention provide a persistent integration platform for conducting a multichannel resource transfer. In particular, the system may utilize a multi-step and multilayered authentication process across multiple disparate computing systems to complete the resource transfer process. In some embodiments, the system may utilize a persistent element which may be accessed by the user across multiple devices which aids in the resource transfer. The system may further require the user to authenticate with multiple methods across the multiple devices, which increases the security of the resource transfer process.

20 Claims, 3 Drawing Sheets

(56) References Cited

U.S. PATENT DOCUMENTS

| | | |
|---|---|---|
| 7,526,792 B2 | 4/2009 | Ross |
| 7,814,470 B2 | 10/2010 | Mamou et al. |
| 8,041,760 B2 | 10/2011 | Mamou et al. |
| 8,108,672 B1 | 1/2012 | Herbach et al. |
| 2005/0005261 A1 | 1/2005 | Severin |
| 2005/0223392 A1 | 10/2005 | Cox et al. |
| 2005/0240354 A1 | 10/2005 | Mamou et al. |
| 2006/0195476 A1 | 8/2006 | Nori et al. |
| 2008/0304104 A1* | 12/2008 | Hirama .............. G06F 21/608 358/1.15 |
| 2009/0204267 A1 | 8/2009 | Sustaeta et al. |
| 2009/0319782 A1 | 12/2009 | Lee |
| 2012/0311614 A1 | 12/2012 | DeAnna et al. |
| 2014/0189808 A1 | 7/2014 | Mahaffey et al. |
| 2014/0280595 A1 | 9/2014 | Mani et al. |
| 2017/0140356 A1 | 5/2017 | Desai et al. |

\* cited by examiner

MULTI-LEVEL AUTHENTICATION SYSTEM WITH PERSISTENT INTEGRATION PLATFORM

CROSS-REFERENCE TO RELATED APPLICATIONS

The present application claims priority to U.S. Provisional Patent Application Ser. No. 62/569,032, filed Oct. 6, 2017 of the same title, the entirety of which is hereby incorporated by reference.

FIELD OF THE INVENTION

The present invention embraces a system, computer program product, and method for conducting a multichannel resource transfer.

BACKGROUND

Traditional resource transfers are typically completed in a single, uninterrupted session. In such scenarios, a user who begins a resource transfer process but wishes to suspend the process must later repeat one or more steps in the resource transfer process in order to achieve completion. Furthermore, gaps in the resource transfer process may introduce security issues arising from inadequate authentication procedures. Accordingly, there is a need for an efficient system that minimizes the need to repeat steps when resuming a resource transfer process while enhancing the security of the resource transfer process.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present invention provides a persistent integration platform which stores user data on resource transfers. The data may include the status of a resource transfer as well as the steps that have been completed by the user to complete the resource transfer. The integration platform may be accessed by a number of different types of authorized devices, which greatly increases the flexibility and the efficiency of the resource transfer system. Furthermore, the system may typically require the user to authenticate one or more times per device that is used to complete one or more steps of the resource transfer process. This in turn increases the security of the system and also increases the confidence level to which the system has correctly identified the user.

Accordingly, embodiments of the present disclosure provide a multi-channel authentication system with a persistent integration platform. The system may comprise a communication interface; a processor; and a memory having executable code stored thereon. The executable code, when executed by the processor, causes the processor to detect that a user has accessed an entity computing system; authenticate the user via the entity computing system using a first authentication method; retrieve, from a resource transfer server, data associated with the user; based on the data associated with the user, prompt the user to initiate a resource transfer process; detect that the user wishes to suspend the resource transfer process; generate a data record of the resource transfer process within a persistent element of the resource transfer server; detect that the user wishes to resume the resource transfer process via a user computing system; and authenticate the user via the user computing system using a second authentication method.

In some embodiments, the first authentication method is different from the second authentication method.

In some embodiments, the executable code further causes the processor to detect that the resource transfer process requires additional authentication credentials; and authenticate the user using a third authentication method.

In some embodiments, the third authentication method is different from the first authentication method and the second authentication method.

In some embodiments, wherein the first authentication method comprises verification using a PIN, wherein the second authentication method comprises verification using a username and password.

In some embodiments, the third authentication method comprises verification using biometric data.

In some embodiments, the executable code further causes the processor to prefill customer information for the resource transfer process.

Embodiments of the present disclosure also provide a computer program product for multi-channel authentication with a persistent integration platform. The computer program product may comprise at least one non-transitory computer readable medium having computer-readable program code portions embodied therein, the computer-readable program code portions comprising an executable portion for detecting that a user has accessed an entity computing system; an executable portion for authenticating the user via the entity computing system using a first authentication method; an executable portion for retrieving, from a resource transfer server, data associated with the user; an executable portion for, based on the data associated with the user, prompting the user to initiate a resource transfer process; an executable portion for detecting that the user wishes to suspend the resource transfer process; an executable portion for generating a data record of the resource transfer process within a persistent element of the resource transfer server; an executable portion for detecting that the user wishes to resume the resource transfer process via a user computing system; and an executable portion for authenticating the user via the user computing system using a second authentication method.

In some embodiments, the first authentication method is different from the second authentication method.

In some embodiments, the computer-readable program code portions further comprise an executable portion for detecting that the resource transfer process requires additional authentication credentials; and an executable portion for authenticating the user using a third authentication method.

In some embodiments, the third authentication method is different from the first authentication method and the second authentication method.

In some embodiments, the first authentication method comprises verification using a PIN, wherein the second authentication method comprises verification using a username and password.

In some embodiments, the third authentication method comprises verification using biometric data.

Embodiments of the present disclosure also provide a computer-implemented method for multi-channel authentication with a persistent integration platform. The method may comprise detecting that a user has accessed an entity computing system; authenticating the user via the entity computing system using a first authentication method; retrieving, from a resource transfer server, data associated with the user; based on the data associated with the user, prompting the user to initiate a resource transfer process; detecting that the user wishes to suspend the resource transfer process; generating a data record of the resource transfer process within a persistent element of the resource transfer server; detecting that the user wishes to resume the resource transfer process via a user computing system; and authenticating the user via the user computing system using a second authentication method.

In some embodiments, the first authentication method is different from the second authentication method.

In some embodiments, the method further comprises detecting that the resource transfer process requires additional authentication credentials; and authenticating the user using a third authentication method.

In some embodiments, the third authentication method is different from the first authentication method and the second authentication method.

In some embodiments, the first authentication method comprises verification using a PIN, wherein the second authentication method comprises verification using a username and password.

In some embodiments, the third authentication method comprises verification using biometric data.

In some embodiments, the method further comprises prefilling customer information for the resource transfer process.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
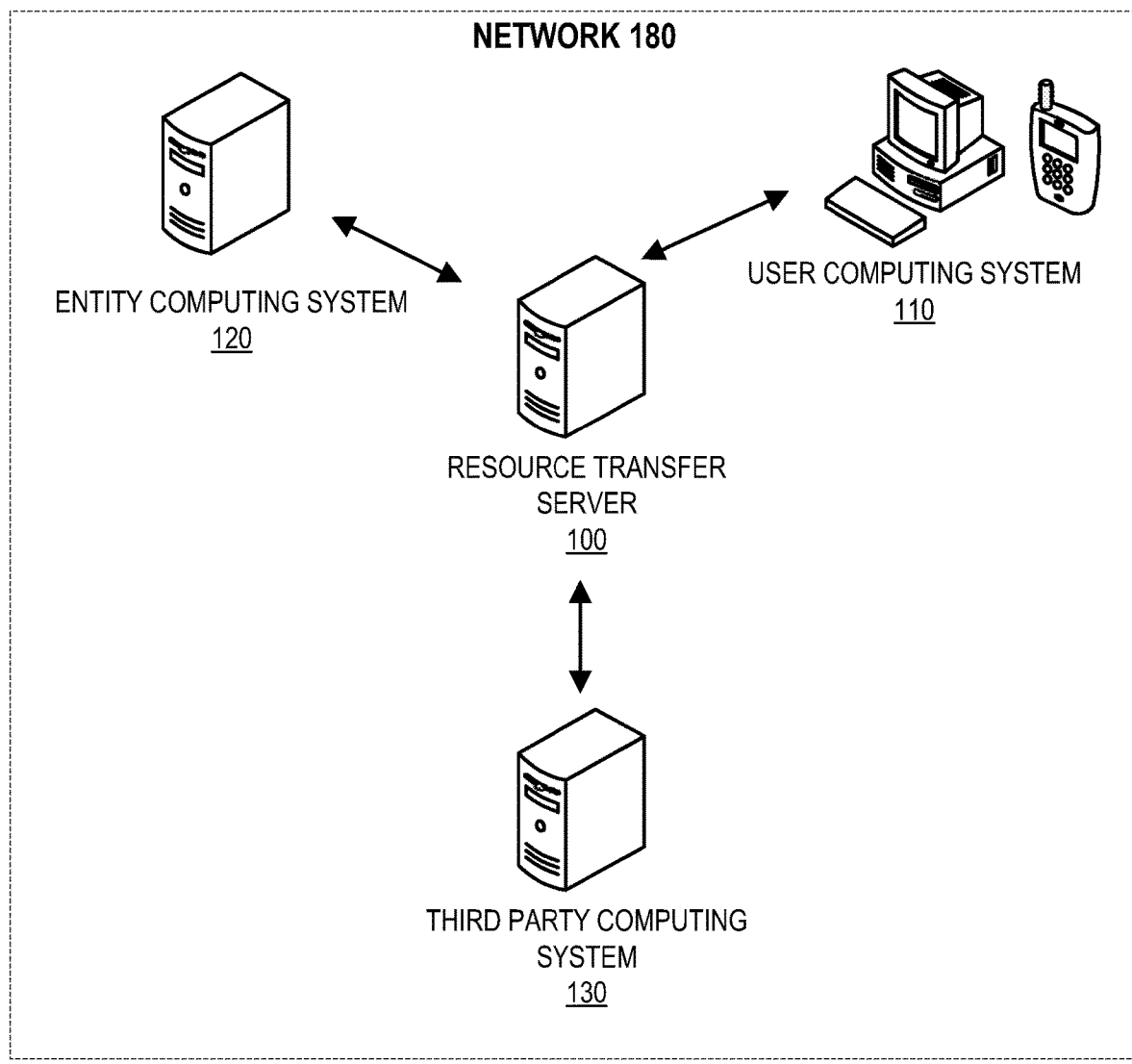
Figure 2:
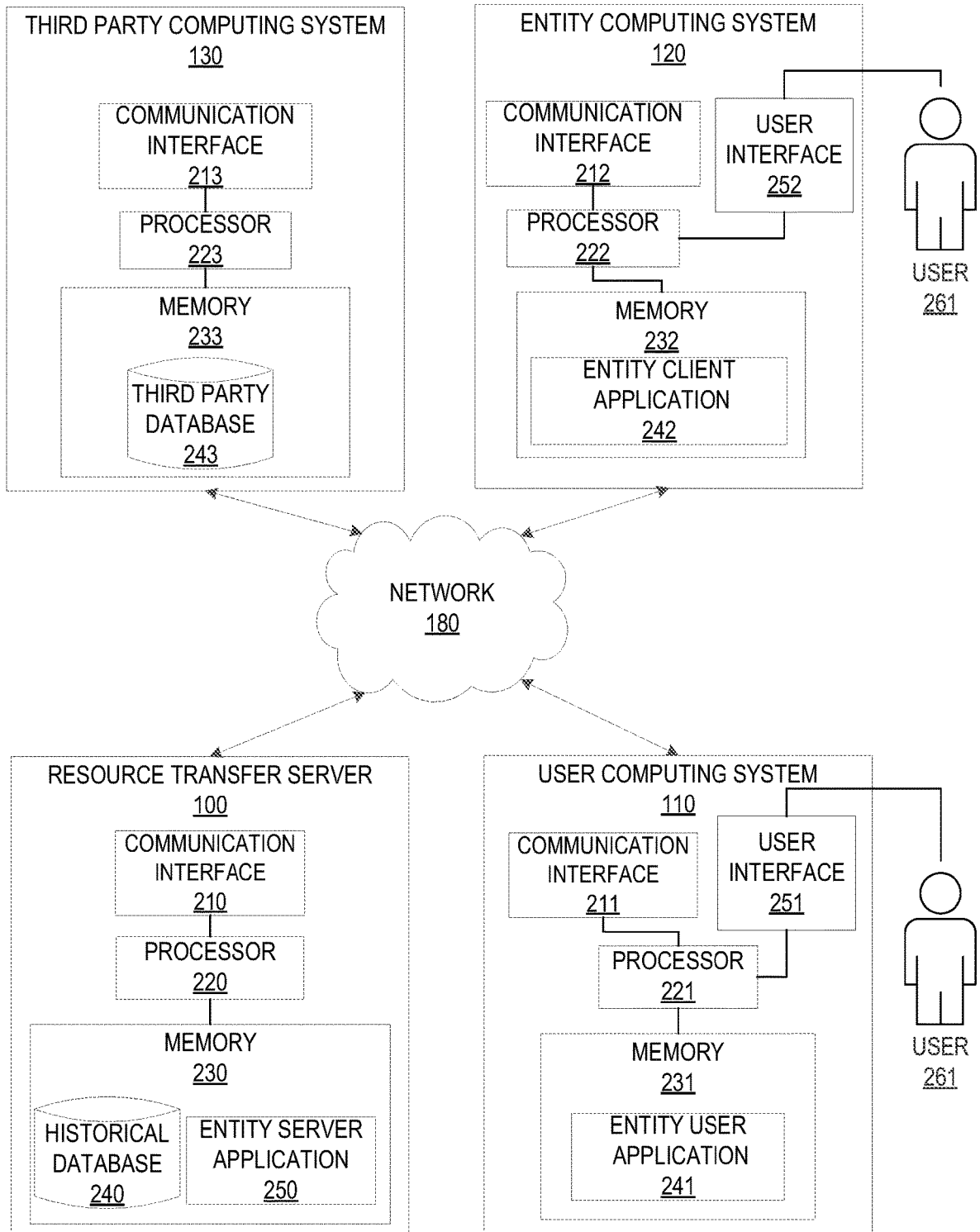
Figure 3:
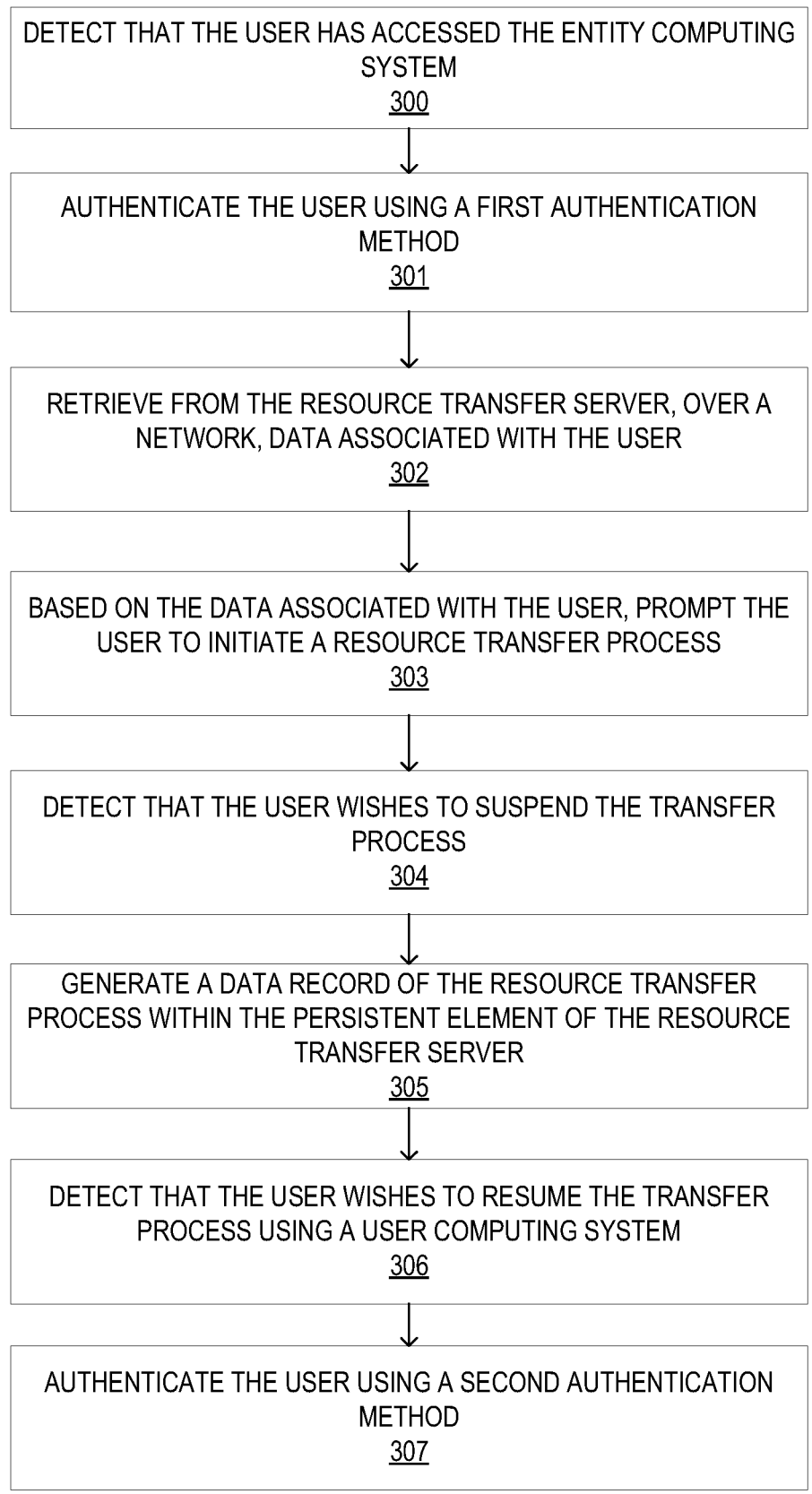

Having thus described embodiments of the invention in general terms, reference will now be made to the accompanying drawings, wherein:

FIG. 1 depicts an operating environment, in accordance with one embodiment of the present invention;

FIG. 2 depicts a block diagram illustrating the resource transfer server, the user computing system, the entity computing system, and the third party computing system in more detail, in accordance with one embodiment of the present invention; and FIG. 3 depicts a process flow for conducting a resource transfer process through a persistent integration platform, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates a system of networked computing devices and/or systems on which the resource transfer system is implemented. The entity may be a business organization, a non-profit organization, a government organization, and the like. In some embodiments, the entity may be a financial institution.

"User" as used herein may refer to an individual who may utilize the system to send digital resource requests. Typically, the user is authorized by the entity to access the system. Accordingly, the user may be a customer of an entity who owns an account within the entity's system. In other embodiments, the user may be a potential customer of the entity. In some embodiments, the user may be an employee, administrator, or representative of the entity.

"Computing system" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing system may be a stationary unit such as a desktop computer or server. In some embodiments, the computing system may be a computer located on the entity's premises, such as a workstation, an ATM, a networked terminal, and the like.

"Account" as used herein may refer to a personalized record kept within an entity on behalf of a user. Each account is associated with a specific authorized user and contains information on resources owned by the user and held by the entity.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

Embodiments of the present invention provide a system, computer program product, and method for conducting a multichannel resource transfer. In particular, the system may utilize a multi-step and multilayered authentication process across multiple disparate computing systems to complete the resource transfer process. In some embodiments, the system may utilize a persistent element which may be accessed by the user across multiple devices which aids in the resource transfer. For instance, the resource transfer process may be started on a first computing system, which may be a stationary networked terminal. At this point, the system may authenticate the user using a first method. Once the user has been authenticated by the first method, a record of the resource transfer may be created within the persistent element. The record may contain, for example, data on the steps of the resource transfer which have already been completed by the user. The user may thereafter access the persistent element through a second computing system, such as a user device, to resume the resource transfer and complete the remaining steps as necessary.

In an exemplary embodiment, a user may enter authentication credentials at an ATM. The system may, via the ATM, provide the user an option to complete a resource transfer, such as a transfer of documents needed for a credit card application. Upon receiving a selection of the option by the user, the system may store a record of the selection within the persistent element, which may be a digital cart. The digital cart may store the steps of the application process that have been completed by the user at the ATM. Upon detecting that the user has left the ATM (e.g. by using location data, by detecting that the user has concluded transacting with the ATM, by using NFC technology, and the like), the ATM may push the digital cart to a number of computing systems associated with the user. In some embodiments, said computing system associated with the user may be a personal computing device such as a tablet, smartphone, laptop, desktop computer, and the like. In other embodiments, the computing system associated with the user may be a terminal within the entity's premises, such as a computer within a branch location operated by the entity. Through said computing system, the user may access the digital cart to complete the application process. When the user attempts to access the digital cart using said computing system, the system may request further authentication credentials from the user. In some embodiments, the further authentication credentials may be different from the authentication credentials requested by the ATM. Once the system has received the further authentication credentials, the system to the user an option to continue the application process. In this way, the system provides an expedient and secure way to transfer resources.

The system as disclosed herein offers a number of technological advantages over traditional methods of conducting resource transfers. Authenticating the user multiple times by using a multitude of authentication methods across the resource transfer process greatly increases the confidence level to which the user's identity is correctly verified by the system. Furthermore, allowing the resource transfer process to be resumed across disparate devices reduces the need to restart the resource transfer process from the beginning upon switching devices, thereby preventing the waste of various computing resources, which may include processing power, memory space, storage space, cache space, electric power, networking bandwidth, and the like.

FIG. 1 is a block diagram illustrating an operating environment, in accordance with one embodiment of the present invention. The operating environment may include a resource transfer server 100 in operative communication with a user computing system 110, an entity computing system 120, and a third party computing system 130 over a network 180. The network 180 may, for example, be a global area network (GAN), such as the Internet, a wide area network (WAN), a local area network (LAN), or any other type of network or combination of networks. The network 180 may provide for wireline, wireless, or a combination wireline and wireless communication between the various devices and computing systems on the network 180.

The resource transfer server 100 comprises the hardware and software necessary to run the multichannel resource transfer system, which coordinates the resource transfer process amongst the user computing system 110, the entity computing system 120, and the third party computing system 130 through an API. Typically, the resource transfer server 100, the user computing system 110, the entity computing system 120, and the third party computing system 130 are owned and operated by an entity or a user. Accordingly, it should be understood by those of ordinary skill in the art that the various devices and computing systems as depicted herein may be embodied in a single device or computing system or multiple devices and/or computing systems operatively connected to one another in a distributed fashion. For instance, the resource transfer server 100 as depicted herein may be owned and operated by a first entity and comprise a series of computing systems acting in parallel to execute the functions of the resource transfer server 100. The resource transfer server 100 may contain a common digital platform that may be accessed from a plurality of different channels.

The entity computing system 120 may be a computer that is owned and operated by an entity. In an exemplary embodiment, the entity may be a financial institution and the entity computing system 120 may be an ATM. The entity computing system 120 may be configured to detect the identity of the user for authentication purposes. In some embodiments, the user may have an account with the entity or be a client of the entity. In such embodiments, the entity computing system 120 may query the resource transfer server 100 for information associated with the user. The entity computing system 120 may prompt the user to provide authentication credentials, such as login information, a PIN, password, and the like. The entity computing system 120 may further be configured to authenticate the user by biometric means, such as a retinal scan, facial recognition, and the like. Once the user has been authenticated, the entity computing system 120 may, based on the user's identity, prompt the user to conduct a resource transfer. In some embodiments, the resource transfer may be the provision of documents to the entity for a credit card application. The entity computing system 120, based on its communications with the resource transfer server 100, may preapprove the user for the credit card and present the offer to the user accordingly. In other embodiments, the user may be a potential client of the entity who has downloaded an application on the user computing system 110. In such embodiments, the entity computing system 120 may be configured to query the user computing system 110 for information associated with the user, which may be accomplished through the Internet, NFC, WiFi, Bluetooth, IR, and other similar communications technologies. In some embodiments, the user may wish to temporarily pause the credit card application process and finish it at a later time on a different device. In such embodiments, the entity computing system 120 may store the state of the application associated with the user within a persistent element, such as a digital cart. In some embodiments, the digital cart may be stored on the resource transfer server 100. In this way, the user is able to access the persistent cart on a different device to complete the application process. Typically, the user will complete the process on the user computing system 110. In other embodiments, the user may utilize a second entity computing system 120, such as a computer located on the entity's premises.

The user computing system 110 is typically owned and operated by a user. In some embodiments, the user computing system 110 may be a portable device such as a smartphone, tablet, PDA, smart device, laptop, and the like. The entity computing system 120 may detect the user computing system 110 is located in close proximity to the entity computing system 120, which may be accomplished by GPS, NFC, WiFi, and the like. The entity computing system 120 may then query the user computing system 110 to determine that an application provided by the entity is installed on the user computing system 110. If the user has begun the resource transfer process at the entity computing system 120 and has indicated that the user wishes to complete the process at a later time, the entity computing system 120 may be configured to push the data within the digital cart to the user computing system 110. Thereafter, the user may access the application provided by the entity on the user computing system 110, where the application may ask for further authentication credentials from the user. In some embodiments, the further authentication credentials may be different from the authentication credentials requested by the entity computing system 120, which may include voice recognition, fingerprint data, secure tokens, and the like. In this way, the user is provided with a convenient way to complete resource transfers, and the entity is provided with a higher degree of security and confidence that the user has been correctly identified.

The third party computing system 130 may be owned and operated by a second entity that is involved in the resource transfer process. The third party computing system 130 may contain information associated with the user. For instance, the third party computing system 130 may be owned and operated by a credit reporting agency which possess data on the user's credit history. In other embodiments, the third party computing system 130 may be owned and operated by real estate or automotive broker companies, from which the resource transfer server 100 scrapes data to provide targeted offers to the user.

FIG. 2 is a block diagram illustrating the resource transfer server 100, the user computing system 110, the entity computing system 120, and the third party computing system 130 in more detail, in accordance with one embodiment of the present invention. The resource transfer server 100 typically contains a processor 220 communicably coupled to such devices as a communication interface 210 and a memory 230. The processor 220, and other processors described herein, typically includes circuitry for implementing communication and/or logic functions of the multichannel resource transfer system. For example, the processor 220 may include a digital signal processor device, a microprocessor device, and various analog to digital converters, digital to analog converters, and/or other support circuits.

The resource transfer server 100 may use the communication interface 210 to communicate with other devices over the network 180. The communication interface 210 as used herein may include an Ethernet interface, an antenna coupled to a transceiver configured to operate on a cellular data or WiFi signal, and/or a near field communication ("NFC") interface.

The resource transfer server 100 may include a memory 230 operatively coupled to the processor 220. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. An entity server application 250 may be stored within the memory 230 of the resource transfer server 100. When executed, the entity server application 250 may securely communicate with the user computing system 110, entity computing system 120, and the third party computing system 130 and provide a common digital platform from which resource transfers may be started and resumed at any point and from any device to which the user has authenticated access. A historical database 240 may be stored within the memory 230, where the historical database 240 may include data associated with the interactions of the system with the user computing system 110, the entity computing system 120, and the third-party computing system 130. The memory 230 may store a data analytics engine, which reads the historical data within the historical database 240 to predict future actions taken by the user computing system 110 and/or the entity computing system 120 and provide recommendations to the user accordingly. Typically, the resource transfer server 100 is owned and/or operated by a first entity such as a financial institution which provides services to the various parties.

The user computing system 110 may comprise a communication interface 211, a processor 221, and a memory 231 having an entity user application 241 stored thereon. The entity user application 241 is typically an application provided by the entity to allow the user to access the resource transfer server 100 to begin, continue, and complete resource transfers regardless of which device was used to begin the process. As such, the user computing system 110 is owned and operated by the user, who is typically a client or potential client of the entity. The user computing system may further comprise a user interface 251 operatively coupled to the processor 221. The user interface 251 may comprise a number of input and output devices to interact with the user. Accordingly, the user interface 251 may comprise a number of input devices such as touchscreens, microphones, cameras, keyboards, keypads, motion sensors, and the like, and/or a number of output devices such as electronic displays, speakers, projectors, and the like. The user interface 251 may further comprise implements to receive authentication data from the user, such as biometric fingerprint readers, voice recognition software, facial recognition software, and the like.

The entity computing system 120 typically includes a processor 222 operatively coupled to a communication interface 212 and a memory 232. The memory 232 may contain an entity client application 242 which causes the processor 323 to interact with the user through the user interface 252, which may include various input devices and output devices as described above. The user interface 252 may further include various implements to authenticate the user, as described above. Typically, the entity computing system 120 is owned and/or operated by the first entity (i.e. the entity that owns and operates the resource transfer server 100) and is located on the entity's premises. The entity client application 242 may comprise the application code needed for the user 261 to access the entity server application 250. Typically, the user 261 completes at least a portion of a resource transfer at the entity computing system 120. In an exemplary embodiment, the entity computing system 120 may be an ATM, which may prompt the user 261 for authentication credentials, such as a PIN, password, voice command, biometric data, and the like. Once the user 261 has been authenticated, the system may query the historical database 240 within the resource transfer server 100 to determine an offer that is appropriate for the user 261. For instance, the system may determine that the user 261 is in the market to buy a house. The system may then, upon determining that the user 261 is eligible for a preapproved mortgage loan, offer to start the loan process at the ATM. Once the user accepts the offer, the application is stored to on the resource transfer server 100 within a persistent digital cart. The digital cart also tracks the status of the application, which may include the steps that have been completed and the steps remaining in the loan application process. In this way, the user 261 is able to resume the application on the user computing system 110 or another authorized device at a later time.

The third party computing system 130 typically includes a processor 223 operatively coupled to a communication interface 213 and a memory 233 having a third party database 243 stored thereon. Typically, the third party computing system 130 is owned and/or operated by a second entity, such as a broker or a credit reporting agency. The third party database 243 may store account data associated with the user. In an exemplary embodiment, the second entity may be a real estate listing agency which possesses data on potential properties that the user may be interested in purchasing. In such embodiments, the resource transfer server 100 may query the third party database 243 to retrieve said user-related data to tailor the mortgage loan offer accordingly.

FIG. 3 illustrates a process flow for conducting a resource transfer process through the persistent integration platform, in accordance with one embodiment of the present invention. The process begins at block 300, where the system detects that the user has accessed the entity computing system. In an exemplary embodiment, the user may be conducting a transaction at an ATM. In some embodiments, the user may have provided input to the ATM, such as by touching the touchscreen or keypad/keyboard inputs. In other embodiments, the user may have triggered a motion sensor, camera, or microphone that detects the user's presence. In yet other embodiments, the ATM may detect the presence of the user by detecting a mobile device carried by the user, such as through GPS collocation, NFC, WiFi, and other technologies.

The process continues to block 301, where the system authenticates the user using a first authentication method. At this step, the system may attempt to determine the identity of the user, which may include whether the user is a customer of the entity. Accordingly, the ATM may request authentication credentials from the user, which may include a PIN, password, voice command, biometric fingerprint data, and the like. The ATM may further gather authentication data through means such as facial recognition, a secured token on the user's mobile device, scanning the user's identification card, and the like. Once the user has been authenticated and/or identified, the system may detect that the user is a client of the entity.

The process continues to block 302, where the system retrieves from the resource transfer server, over a network, data associated with the user. Typically, the user is a client of the entity. In this scenario, the system has direct access to the client's information, such as account data, biographical information, spending habits, behaviors, and the like. The system may retrieve such data from the entity's servers to provide a more streamlined experience to the user when conducting resource transfers. In other embodiments, the system may detect that the user is not a client of the entity. In such a scenario, the system may retrieve data associated with the user from one or more third party servers, which may include real estate or vehicle listing services, credit reporting agencies, and the like.

The process continues to block 303, where the system, based on the data associated with the user, prompts the user to initiate a resource transfer process. In an exemplary embodiment, the resource transfer process may be a transfer of necessary information from the user to the system in order to complete a credit card application. The user may, based on the information provided by the user and retrieved from the entity's servers and/or third party servers, make recommendations for products and/or services offered by the entity that may be of interest to the user. The prompt/offer may be presented to the user through an output device within or connected to the ATM, such as an illuminated display. The user may then be able to provide input to accept or reject the offer, such as by touchpad, keypad, voice commands, and the like. If the user accepts the offer, the ATM may initiate the application process by pre-filling certain required information based on the user's input as well as data retrieved from the entity's servers and/or third party servers.

The process continues to block 304, where the system detects that the user wishes to suspend the transfer process. In some circumstances, the application process may require additional information or documents that the user may not be able to provide in a timely manner when conducting transactions at the ATM. Accordingly, the ATM may display an option to the user to save the application for completion at a later time. In other embodiments, the ATM may, based on the nature of the application, automatically save the application for completion at a later time by pushing the application to the user's mobile computing system.

The process continues to block 305, where the system generates a data record of the resource transfer process within the persistent element of the resource transfer server. Typically, the persistent element is a digital cart stored within the entity's servers. The data record within the digital cart may be pushed to the user's mobile device for completion of the application at a later time. This digital cart creates a persistent integration platform which allows the user to complete the application on a multitude of disparate devices and channels; because the digital cart is accessible centrally, the user need not at any point restart any portion of the application process, which prevents the waste of computing resources associated with the duplication of steps in the application.

The process continues to block 306, where the system detects that the user wishes to resume the transfer process using a user computing system. In some embodiments, the user computing system may be a mobile device such as a smartphone or tablet. In other embodiments, the user computing system may be a device such as a desktop or laptop computer. The system may detect that the user has attempted to access the entity's servers using the user computing system. In some embodiments, the user may have attempted to resume the process through a third party application such as a web browser. In other embodiments, the user may attempt to resume the application process via the entity user application provided by the entity.

The process concludes at block 307, where the system authenticates the user using a second authentication method. Typically, the system will require the user to provide authentication credentials in addition to the credentials provided by the user when initiating the resource transfer. For instance, if the user provided a PIN at the ATM, the user may be required to provide a password or biometric thumbprint to resume the application process. As another example, if the user has provided a password at the ATM, the user may be prompted to provide facial recognition data, secured tokens, and the like. In some embodiments, the system may require that the second authentication method is different from the first authentication method. In this way, the system is able to significantly increase the confidence level to which the system is able to correctly identify the user. This greatly increases the security of the resource transfer system and reduces the incidence of wasted computing resources associated with correcting incorrect identifications.

In some embodiments, the confidence level to which the system is able to correctly identify the user may change depending on the type of resource transfer process. For instance, the number and/or type of credentials required may increase as the loan amount of the application increases. In an exemplary embodiment, the system may detect that the resource transfer process requires additional credentials (e.g., in addition to the credentials provided by the user). In such embodiments, the system may authenticate the user using a third (or fourth, or so on) authentication method which may be different from the first and second authentication methods.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/153,317, now published as 2019/0140970 | PERSISTENT INTEGRATION PLATFORM FOR MULTI-CHANNEL RESOURCE TRANSFERS | Concurrently herewith |

What is claimed is:

1. A system for a persistent integration platform for multi-channel resource transfers, the system comprising:
   a communication interface;
   a processor; and
   a memory having executable code stored thereon, wherein the executable code, when executed by the processor, causes the processor to:
      detect that a user has accessed an entity computing system;
      authenticate the user via the entity computing system using a first authentication method;
      retrieve, from a resource transfer server, data associated with the user;
      based on the data associated with the user, prompt the user to initiate a resource transfer process;
      detect that the user wishes to suspend the resource transfer process on the entity computing system;
      generate a data record of the resource transfer process within a persistent element of the resource transfer server, wherein the persistent element is accessible by the entity computing system and a user computing system, wherein the data record indicates steps of the resource transfer process already completed by the user and steps remaining in the resource transfer process;
      detect that the user wishes to resume the resource transfer process via the user computing system;
      authenticate the user via the user computing system using a second authentication method; and
      resume, on the user computing system, the resource transfer process based on the steps remaining in the resource transfer process.

2. The system of claim 1, wherein the first authentication method is different from the second authentication method.

3. The system of claim 1, wherein the executable code further causes the processor to:
   detect that the resource transfer process requires additional authentication credentials; and
   authenticate the user using a third authentication method.

4. The system of claim 3, wherein the third authentication method is different from the first authentication method and the second authentication method.

5. The system of claim 1, wherein the first authentication method comprises verification using a PIN, wherein the second authentication method comprises verification using a username and password.

6. The system of claim 3, wherein the third authentication method comprises verification using biometric data.

7. The system of claim 1, wherein the executable code further causes the processor to prefill customer information for the resource transfer process.

8. A computer program product for multi-channel authentication with a persistent integration platform, the computer program product comprising at least one non-transitory computer readable medium having computer-readable program code portions embodied therein, the computer-readable program code portions comprising:
   an executable portion for detecting that a user has accessed an entity computing system;
   an executable portion for authenticating the user via the entity computing system using a first authentication method;
   an executable portion for retrieving, from a resource transfer server, data associated with the user;
   an executable portion for, based on the data associated with the user, prompting the user to initiate a resource transfer process;
   an executable portion for detecting that the user wishes to suspend the resource transfer process on the entity computing system;
   an executable portion for generating a data record of the resource transfer process within a persistent element of the resource transfer server, wherein the persistent element is accessible by the entity computing system and a user computing system, wherein the data record indicates steps of the resource transfer process already completed by the user and steps remaining in the resource transfer process;
   an executable portion for detecting that the user wishes to resume the resource transfer process via the user computing system;
   an executable portion for authenticating the user via the user computing system using a second authentication method; and
   an executable portion for resuming, on the user computing system, the resource transfer process based on the steps remaining in the resource transfer process.

9. The computer program product of claim 8, wherein the first authentication method is different from the second authentication method.

10. The computer program product of claim 8, the computer-readable program code portions further comprising:
    an executable portion for detecting that the resource transfer process requires additional authentication credentials; and
    an executable portion for authenticating the user using a third authentication method.

11. The computer program product of claim 10, wherein the third authentication method is different from the first authentication method and the second authentication method.

12. The computer program product of claim 8, wherein the first authentication method comprises verification using a PIN, wherein the second authentication method comprises verification using a username and password.

13. The computer program product of claim 10, wherein the third authentication method comprises verification using biometric data.

14. A computer-implemented method for multi-channel authentication with a persistent integration platform, the method comprising:
- detecting that a user has accessed an entity computing system;
- authenticating the user via the entity computing system using a first authentication method;
- retrieving, from a resource transfer server, data associated with the user;
- based on the data associated with the user, prompting the user to initiate a resource transfer process;
- detecting that the user wishes to suspend the resource transfer process on the entity computing system;
- generating a data record of the resource transfer process within a persistent element of the resource transfer server, wherein the persistent element is accessible by the entity computing system and a user computing system, wherein the data record indicates steps of the resource transfer process already completed by the user and steps remaining in the resource transfer process;
- detecting that the user wishes to resume the resource transfer process via the user computing system;
- authenticating the user via the user computing system using a second authentication method; and
- resuming, on the user computing system, the resource transfer process based on the steps remaining in the resource transfer process.

15. The computer-implemented method of claim 14, wherein the first authentication method is different from the second authentication method.

16. The computer-implemented method of claim 14, the method further comprising:
- detecting that the resource transfer process requires additional authentication credentials; and
- authenticating the user using a third authentication method.

17. The computer-implemented method of claim 16, wherein the third authentication method is different from the first authentication method and the second authentication method.

18. The computer-implemented method of claim 14, wherein the first authentication method comprises verification using a PIN, wherein the second authentication method comprises verification using a username and password.

19. The computer-implemented method of claim 16, wherein the third authentication method comprises verification using biometric data.

20. The computer-implemented method of claim 14, the method further comprising prefilling customer information for the resource transfer process.

* * * * *